F. H. CLARK & J. M. COFFEY.
STUFFING BOX.
APPLICATION FILED MAY 19, 1916.

1,243,712.

Patented Oct. 23, 1917.

Witness
Dudley Browne

Inventors
F. H. Clark and
J. M. Coffey

By Browne & Phelps
Attorneys

UNITED STATES PATENT OFFICE.

FRANK H. CLARK AND JOSEPH M. COFFEY, OF NEW YORK, N. Y., ASSIGNORS TO CHAMBERS VALVE COMPANY, OF NEW YORK, N. Y., A CORPORATION OF NEW YORK.

STUFFING-BOX.

1,243,712.  Specification of Letters Patent.  Patented Oct. 23, 1917.

Application filed May 19, 1916. Serial No. 98,651.

*To all whom it may concern:*

Be it known that we, FRANK H. CLARK and JOSEPH M. COFFEY, citizens of the United States, residing at New York, in the county of New York and State of New York, have invented certain new and useful Improvements in Stuffing-Boxes, of which the following is a specification.

This invention relates to stuffing boxes and more particularly to stuffing boxes adapted for use in connection with the actuating mechanism of throttle valves for steam boilers. While the invention will be hereinafter described with relation to such application, it is however, to be understood that without material modification the device may be applied to other uses.

One of the objects of the present invention is to provide a reliable and efficient stuffing box adapted for the above use having few parts which will be relatively inexpensive to manufacture. A further object is to provide a simple and practical stuffing box which may be easily and quickly applied and is capable of ready adjustment to suit varying conditions. A further object is to provide a stuffing box of the above general character adapted to permit a free and easy movement of the parts and prevent binding or gripping of the power transmitting elements. A further object is to provide suitable lubricating and draining features in order to increase the general durability and efficiency of the device.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

Figure 1:
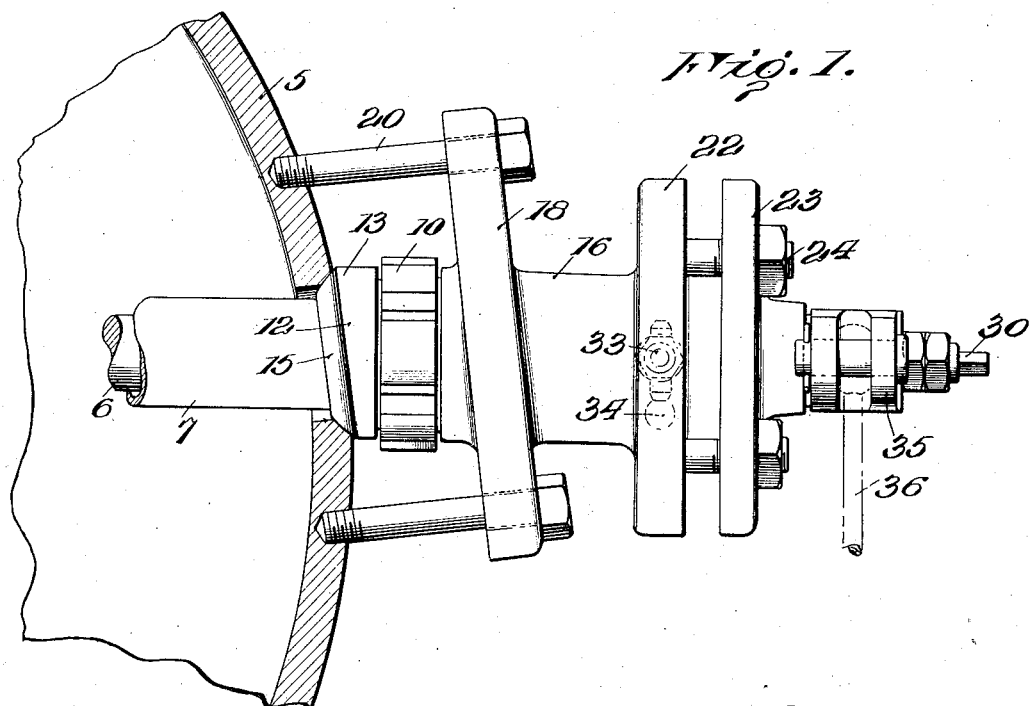
Figure 2:
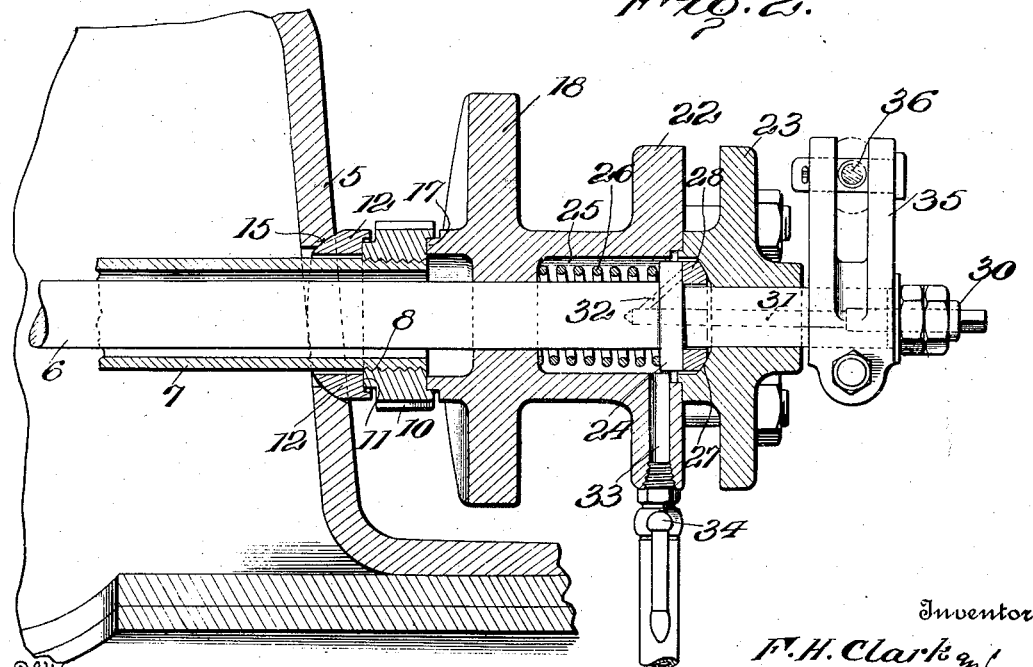

To enable others skilled in the art so fully to comprehend the underlying features thereof that may embody the same by the numerous modifications in structure and relation contemplated by this invention, drawings depicting a preferred form have been annexed as a part of this disclosure, and in such drawings, like characters of reference denote corresponding parts throughout all the views, of which:

Figure 1 is a plan view of the complete device as applied to the exterior of the steam dome (shown in section) of a boiler of the locomotive type; and Fig. 2 is a central longitudinal vertical section of the box.

Referring now to the drawings in detail and more particularly to Fig. 1, 5 denotes a steam dome wall within which is positioned a throttle valve of any well known character. Leading from this valve is an operating shaft 6 inclosed within a casing or cover 7 extending between the wall of the throttle box (not shown) and the wall of the steam dome and adapted to project slightly beyond the latter, as shown more clearly in Fig. 2. Its outer end is threaded as indicated at 8 and adapted to be engaged by a nut 10 provided with a boss 11 on one side engaging a corresponding recess in a joint member 12. This joint member is of peculiar construction or shape being wider at one side 13 than at the other side and being provided upon the surface adjacent the dome with a curved or semi-spherical face 15 adapted to coact with a correspondingly formed surface about the opening in the steam dome 5.

As is well known, the more modern steam domes are not only cylindrical in shape but have a downward and outward curve or flare which renders their exterior surface generally irregular. The opening made therein is consequently at a peculiar angle which varies with the location and by forming the joint member 12 as herein shown it may be turned about its central axis to conform to the peculiarities of the opening.

At this point, it may be noted that in assembling the parts the operating shaft is covered with the loose sleeve or member 7 having its inner end screwed into the throttle box. The loose joint 12 is slipped over the free end of the sleeve and rotated until it properly fits the opening in the steam dome after which the nut 10 is screwed tight to hold the parts so far assembled in fixed position.

The body portion 16 of the stuffing box is then slipped over the free end of the operating shaft with a projecting flange 17 engaging a recessed surface of the nut 10. This body 16 is provided with a flange 18 which may have openings near its periphery through which bolts 20 pass to engage threaded openings or recesses in the steam dome as shown for holding this part in place. It will be noted by reference to Fig. 1 that this flange 18 is disposed at an angle to its longitudinal axis and may be rotated until this flange is substantially parallel to the tangent of the curved surface of the dome. At the opposite end of the member 16 is a second flange 22 to which a cover member 23 is adapted to be secured as by means of bolts 24 passing through openings in its periphery and threadedly engaging the flange 22.

The operating shaft 6 is preferably provided with a cylindrical ring 24 at a point substantially flush with the end of the body member 16 and loosely fitting within a chamber 25 formed in the body 16. A spiral spring 26 surrounds the shaft and acts and reacts between this flange 24 and the opposite wall of the chamber 25. The cover member 23 of the stuffing box is provided with a semi-spherical surface 27 against which a packing ring 28 is adapted to bear. This ring reacts against the adjacent face of the flange 24 and is yieldingly held in place by the spiral spring 26 and is loose on the rod 6 as shown.

At the end of the operating shaft 6 is a grease plug 30 which communicates by means of passage 31 to a point behind the packing ring 28. One or more by-passes 32 lead through the flange 24 to the rear surface of the packing ring 26, thereby to properly lubricate the same and prevent binding or gripping of the ring, thus retarding its action.

The lower part of the chamber 25 is provided with a drain tube 33 having a stop cock 34 to permit the removal of condensed steam or excess oil which may accumulate within the stuffing box. An actuating member 35 is mounted upon the free end of the operating shaft which in turn is adapted to be connected to a pull rod 36 leading to the throttle lever.

The operation and method of use of a device of this character are well known to those familiar with the subject and a detailed statement thereof is believed to be unnecessary.

It will be seen from the above description that the parts may be easily and quickly assembled and adjusted according to their location and application. The peculiar arrangement and construction of the exterior parts insures a tight steam joint yet one which will in no way retard or prevent the free movement of the actuating or power transmitting parts, as well as other expansion and contraction under varying temperatures. These parts may be easily and quickly removed and replaced should repairs be necessary and are provided with means for properly keeping them clean and lubricated at all times.

In short, the invention is believed to accomplish, among others, all of the objects and advantages herein set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims:

Having thus described our invention what we claim as new and desire to secure by Letters Patent is—

1. In a stuffing box, in combination with an irregularly curved surface having an opening to which the box is adapted to be secured, an operating shaft, a sleeve for said shaft, a joint member surrounding said sleeve and adapted to engage said opening adjustably, a nut on said sleeve adapted to hold said joint member tightly in place, and a body member engaging said nut.

2. In a stuffing box, in combination with an irregularly curved surface having an opening to which the box is adapted to be secured, an operating shaft, a sleeve therefor, a ball joint member wider at one side than the other loosely fitting said sleeve and engaging the opening in said surface adjustably, means for holding said joint member in place, a body member engaging the opposite side of said holding means having a stuffing box chamber, and means for draining said chamber.

3. In a stuffing box, in combination with the irregularly curved surface of a steam dome having an opening therethrough to which the box is adapted to be secured, an operating shaft projecting through said opening and having a cylindrical flange near its free outer end, a body member provided with a stuffing box chamber surrounding said shaft, means for adjustably connecting said member with said curved surface, an end cover member for said chamber having a semi-spherical surface, and a ring of packing material loosely surrounding said shaft and interposed between the cylindrical flange and said semi-spherical surface.

4. In a stuffing box, in combination with an irregularly curved surface having an opening to which the box is adapted to be adjustably secured, an operating shaft projecting through said opening in the surface having a flange near its free outer end, a body member provided with a stuffing box chamber surrounding said shaft, an end cover member for said chamber having a concave surface, packing material interposed between the flange and concave surface, means for lubricating one of the surfaces of said packing material, fastening means for securing the cover to the body member, and separate fastening means for adjustably securing the body member to the surface.

5. In a stuffing box, in combination with a curved surface having an opening to which the box is adapted to be adjustably secured, an operating shaft projecting through said opening in the surface having a flange near its free outer end, a body member provided with a stuffing box chamber surrounding said shaft, an end cover member for said chamber having a concave surface, means connected with said curved surface for holding said cover and body member against longitudinal movement with respect to the axis of the shaft, packing material interposed between the flange and surface, and means for lubricating the surface of the flange adjacent the packing material.

6. In a stuffing box, in combination with an irregularly curved surface having an opening to which the box is adapted to be adjustably secured, an operating shaft projecting through said opening and having a flange with a flat face near its free end, a body member surrounding said shaft and provided with a stuffing box chamber, a ball joint member wider on one side than the other interposed between the surface and the body member permitting adjustment of connection according to the location of the opening in said surface, an end cover member for said chamber having a curved concave surface, a packing material interposed between the flat face of the flange and said curved surface, and spring means within the chamber acting on said flange to press the same against the packing.

7. In a stuffing box, in combination with an irregularly curved surface having an opening to which the box is adapted to be adjustably secured, an operating shaft projecting through said opening and having a flange near its free end, a sleeve partially covering said shaft, a body member surrounding said shaft, and provided with a stuffing box chamber, a threaded nut engaging the end of the sleeve and an adjustable joint member interposed between the nut and the surface capable of being turned to properly close the opening regardless of its location in said surface, an end cover member for said chamber, a packing material interposed between the flange and cover, spring means for holding the flange and packing material in engagement, and means for lubricating one of the surfaces of said packing material.

8. In a stuffing box, in combination with a surface having an opening to which the box is adapted to be secured, an operating shaft extending through said opening, a sleeve loosely fitting said shaft, a ball joint member on said sleeve wider on one side than the other adapted to be adjusted into fitting relation with the opening, a nut secured to said sleeve for holding said joint member in place, a body member having a flange near one end, means for securing said flange directly to said surface, an end cover member for said body member having a concave semispherical inner surface, a packing ring surrounding said operating shaft engaging said last named surface, a flange on said shaft abutting said packing ring, and a spring yieldingly holding said last mentioned parts together.

9. In a stuffing box, in combination with an irregular surface having an opening to which the box is adapted to be secured, an operating shaft extending through said opening, a sleeve loosely fitting said shaft, a joint on said sleeve adapted to be adjusted into fitting relation with the opening in said irregular surface, a nut secured to said sleeve for holding said joint in place, a body member having a flange near each end, means for securing one of said flanges to said surface, an end cover member for said body member having a concave surface, a packing ring surrounding said operating shaft engaging said concave surface, a flange on said shaft abutting said packing ring, a spring yieldingly holding said parts together, and means for lubricating said packing ring.

10. In a stuffing box, in combination with a surface having an opening to which the box is adapted to be secured, an operating shaft extending through said opening, a sleeve loosely fitting said shaft, an adjustable joint on said sleeve adapted to be rotated into fitting relation with the opening, means secured to said sleeve for holding said joint in place, a body member having a flange near each end, means for securing one of said flanges to said surface, an end cover member for said body member, a packing ring surrounding said operating shaft and engaging said cover, a flange on said shaft abutting said packing ring, a spring yieldingly engaging said flange to press it against said ring, and means for draining the space surrounding said spring.

11. In a stuffing box, in combination with a surface having an opening to which the box is adapted to be secured, an operating shaft extending through said opening, a joint about said shaft adapted to be adjusted rotatably into fitting relation with the opening, a nut for holding said joint in place, a body member engaging said nut and having a flange, means for securing said flange directly to said surface, an end cover member for said body member having a concave surface, a packing ring surrounding said operating shaft and engaging said concave surface, a flange on said shaft abutting said packing ring, a spring yieldingly holding said parts together, a grease cup at the end of said operating shaft, intervening passages for transmitting lubricant to the packing ring, and means for draining the space adjacent the packing ring.

12. In a stuffing box, in combination, with a curved surface having an opening adjacent which the stuffing box is adapted to be secured, an operating shaft passing through said opening, a sleeve partially covering said shaft and projecting through said opening, a ball joint member wider at one side than the other fitting over said sleeve and engaging the opening in said surface, means for holding said joint member in place, a body member engaging the opposite side of said holding means having a stuffing box chamber, and means for securing said body member to said curved surface.

13. In a stuffing box, in combination, a shaft having a longitudinally disposed lubricating duct therein, a grease plug at the end of said shaft, a flange with a substantially plane surface secured on said shaft, a body member having a chamber surrounding said shaft and flange, and a cover for said member, a spring within said chamber acting between an end wall thereof and said flange, a packing ring between the flange and the adjacent surface of the cover portion, said packing ring being loosely mounted upon said shaft, and means for conducting lubricant from said duct in said shaft directly to the adjacent surfaces of the flange and packing ring.

14. In a stuffing box, in combination, an actuating rod having a flat shoulder portion, a stuffing box member surrounding said rod and shoulder, a cover coacting with said member having a concave surface, a packing ring loosely mounted upon said rod interposed between the shoulder and the cover portion, and means for lubricating one of the surfaces of said packing rings including a passageway bored centrally through said shaft having by-passes extending to said packing ring.

15. In a stuffing box, in combination, an actuating rod having a flat shoulder portion, a stuffing box member surrounding said rod and shoulder, a cover coacting with said member having a concave surface, a packing ring loosely mounted upon said rod interposed between the shoulder and the cover portion, and means for lubricating one of the surfaces of said packing ring, said means including a grease cup mounted in the end of said actuating rod and having a passage communicating with a point closely adjacent the shoulder.

In testimony whereof we affix our signatures in presence of two witnesses.

FRANK H. CLARK.
JOSEPH M. COFFEY.

Witnesses:
  FRED A. KUNEMUND,
  ALEX. TURNER.